United States Patent
Hashiguchi et al.

(10) Patent No.: US 9,291,817 B2
(45) Date of Patent: Mar. 22, 2016

(54) OPTICAL DEFLECTION DEVICE, APPARATUS INCLUDING THE SAME, AND METHOD OF CONTROLLING OPTICAL DEFLECTING DEVICE

(71) Applicants: Tsuyoshi Hashiguchi, Kanagawa (JP); Tomofumi Kitazawa, Kanagawa (JP); Goichi Akanuma, Kanagawa (JP)

(72) Inventors: Tsuyoshi Hashiguchi, Kanagawa (JP); Tomofumi Kitazawa, Kanagawa (JP); Goichi Akanuma, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 9 days.

(21) Appl. No.: 14/483,393

(22) Filed: Sep. 11, 2014

(65) Prior Publication Data

US 2015/0077823 A1    Mar. 19, 2015

(30) Foreign Application Priority Data

Sep. 13, 2013  (JP) ................................ 2013-190410

(51) Int. Cl.
   *G02B 26/08* (2006.01)
   *G02B 26/10* (2006.01)
   *H04N 9/31* (2006.01)

(52) U.S. Cl.
   CPC .......... *G02B 26/105* (2013.01); *G02B 26/0858* (2013.01); *G02B 26/101* (2013.01); *H04N 9/3135* (2013.01)

(58) Field of Classification Search
   CPC .. G02B 26/101; G02B 21/28; G02B 26/0841; G02B 26/085; G02B 26/0858; H04N 9/3135; H01S 5/18308

USPC ...................... 359/198.1, 199.1, 199.4, 200.8, 359/223.1–226.1
See application file for complete search history.

(56) References Cited

U.S. PATENT DOCUMENTS 6,054,335 A * 4/2000 Sun ..................... H01S 5/18308
                                                              438/23
2012/0242191 A1   9/2012 Aimono

FOREIGN PATENT DOCUMENTS

| JP | 2011-107505 | 6/2011 |
| JP | 2012-198314 | 10/2012 |
| JP | 2012-198415 | 10/2012 |

OTHER PUBLICATIONS

The Extended European Search Report issued Jan. 26, 2015, in Application No. / Patent No. 14183435.8-1562.

* cited by examiner

*Primary Examiner* — Euncha Cherry
(74) *Attorney, Agent, or Firm* — Oblon, McClelland, Maier & Neustadt, L.L.P.

(57) ABSTRACT

An optical deflecting device includes a mirror having a reflecting surface and a support unit to support the mirror. The support unit includes a first drive unit. The first drive unit includes a plurality of continuously meandering first beams and a plurality of first piezoelectric members respectively provided to the plurality of first beams to swing the mirror around a first axis to deflect light incident on the reflecting surface of the mirror. Two voltages having non-similar waveforms are respectively applied in parallel to each two of the first piezoelectric members respectively provided to adjacent two of the first beams.

19 Claims, 8 Drawing Sheets

OPTICAL DEFLECTION DEVICE, APPARATUS INCLUDING THE SAME, AND METHOD OF CONTROLLING OPTICAL DEFLECTING DEVICE

CROSS-REFERENCE TO RELATED APPLICATION

This patent application is based on and claims priority pursuant to 35 U.S.C. §119(a) to Japanese Patent Application No. 2013-190410, filed on Sep. 13, 2013, in the Japan Patent Office, the entire disclosure of which is hereby incorporated by reference herein.

BACKGROUND

1. Technical Field

This disclosure relates to an optical deflecting device, an image forming apparatus, a vehicle, a method of controlling an optical deflecting device, and a method of adjusting an optical deflecting device, and more specifically to an optical deflecting device that deflects light, an apparatus or structure including the optical deflecting device, and a method of controlling the optical deflecting device.

2. Related Art

An optical deflector drive device may be configured to include a mirror having a reflecting surface and a drive unit including a plurality of continuously meandering beams and a plurality of piezoelectric members respectively provided to the plurality of beams to swing the mirror to deflect light incident on the reflecting surface of the mirror. It is desirable to swing the mirror at a constant speed in this type of optical deflector drive device.

SUMMARY

In one embodiment of this disclosure, there is provided an improved optical deflecting device that, in one example, includes a mirror having a reflecting surface and a support unit to support the mirror. The support unit includes a first drive unit. The first drive unit includes a plurality of continuously meandering first beams and a plurality of first piezoelectric members respectively provided to the plurality of first beams to swing the mirror around a first axis to deflect light incident on the reflecting surface of the mirror. Two voltages having non-similar waveforms are respectively applied in parallel to each two of the first piezoelectric members respectively provided to adjacent two of the first beams.

In one embodiment of this disclosure, there is provided an improved apparatus, such as an image forming apparatus, that, in one example, includes a light source device including a light source to emit light modulated based on image information and the above-described optical deflecting device to deflect the light emitted from the light source device to a scanning surface to scan the scanning surface with the light and form an image on the scanning surface.

In one embodiment of this disclosure, there is provided an improved structure, such as a vehicle that, in one example, includes the above-described image forming apparatus.

In one embodiment of this disclosure, there is provided an improved method of controlling the above-described optical deflecting device. The method includes applying, in parallel and respectively, two voltages having non-similar waveforms to each two of the first piezoelectric members respectively provided to adjacent two of the first beams.

As an example of the method of controlling, there is provided an improved method of adjusting the above-described optical deflecting device. The method includes applying, in parallel and respectively, two voltages to each two of the first piezoelectric members respectively provided to adjacent two of the first beams, adjusting an amplitude or duty ratio of at least one of the two voltages to minimize fluctuations in a swing speed of the mirror around the first axis, and storing one of the adjusted amplitude or duty ratio and a value based on the adjusted amplitude or duty ratio.

BRIEF DESCRIPTION OF THE DRAWINGS

A more complete appreciation of this disclosure and many of the advantages thereof are obtained as the same becomes better understood by reference to the following detailed description when considered in connection with the accompanying drawings, wherein.

DETAILED DESCRIPTION

Figure 1:
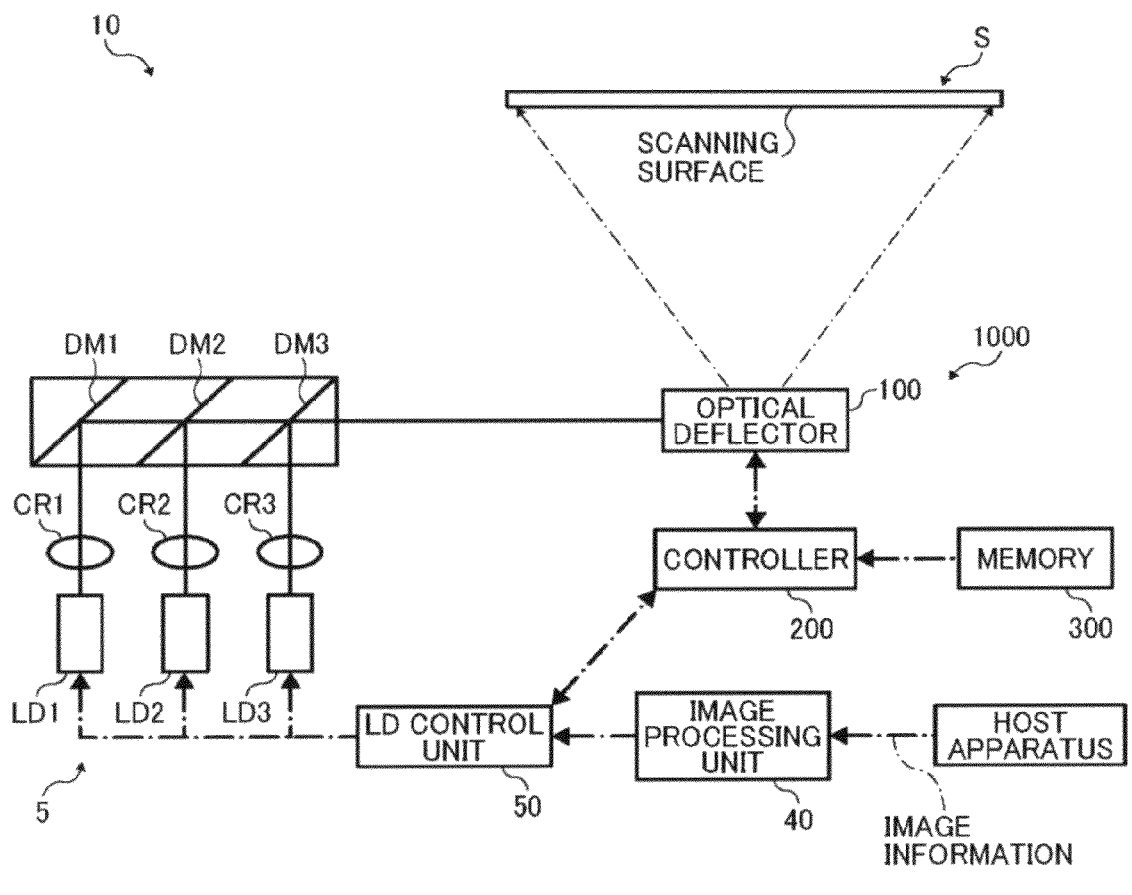
FIG. 1 is a diagram illustrating a schematic configuration of a projector according to an embodiment of this disclosure.

In describing the embodiments illustrated in the drawings, specific terminology is adopted for the purpose of clarity. However, this disclosure is not intended to be limited to the specific terminology so used, and it is to be understood that substitutions for each specific element can include any technical equivalents that have the same function, operate in a similar manner, and achieve a similar result.

Referring now to the drawings, wherein like reference numerals designate identical or corresponding parts throughout the several views, an embodiment of this disclosure will be described with reference to FIGS. 1 to 7B.

FIG. 1 illustrates a schematic configuration of a projector 10 serving as an image forming apparatus according to an embodiment of this disclosure. The projector 10 is used placed on a floor or table or hung from a ceiling or on a wall in a building, for example. Note that the following description is given with reference, where necessary, to a three-dimensional orthogonal XYZ coordinate system illustrated in FIG. 1, in which the Z-axis direction corresponds to a direction perpendicular to the drawing plane. Specifically, arrow X in FIG. 1 represents the +X direction, and the direction opposite thereto represents the −X direction. Similarly, arrow Y in FIG. 1 represents the +Y direction, and the direction opposite thereto represents the −Y direction. Further, dot Z in FIG. 1 represents the +Z direction, i.e., a vertically upward direction from the drawing plane, and the direction opposite thereto represents the −Z direction.

The projector 10 includes, for example, a light source device 5, an optical deflecting device 1000, and an image processing unit 40.

The light source device 5 includes, for example, three laser diodes LD1, LD2, and LD3, three collimator lenses CR1, CR2, and CR3, three dichroic mirrors DM1, DM2, and DM3, and an LD control unit 50.

The laser diode LD1, which is a red laser, for example, is disposed to emit red light having a wavelength of 640 nm in the +Y direction. The laser diode LD2, which is a blue laser, for example, is disposed on the +X side of the laser diode LD1 to emit blue light having for a wavelength of 450 nm in the +Y direction. The laser diode LD3, which is a green laser, example, is disposed on the +X side of the laser diode LD2 to emit green light having a wavelength of 520 nm in the +Y direction. The laser diodes LD1 to LD3 are controlled by the LD control unit 50.

The collimator lens CR1 is, for example, disposed on the +Y side of the laser diode LD1 to collimate the red light emitted from the laser diode LD1 into substantially parallel light. The collimator lens CR2 is, for example, disposed on the +Y side of the laser diode LD2 to collimate the blue light emitted from the laser diode LD2 into substantially parallel light. The collimator lens CR3 is, for example, disposed on the +Y side of the laser diode LD3 to collimate the green light emitted from the laser diode LD3 into substantially parallel light.

Each of the three dichroic mirrors DM1 to DM3 is a thin film, such as a dielectric multilayer film, for example, which reflects light having a specific wavelength and transmits light having any other wavelength.

The dichroic mirror DM1 is, for example, disposed on the +Y side of the collimator lens CR1 to be tilted at 45°, for example, to the X-axis and the Y-axis to reflect the red light collimated by the collimator lens CR1 in the +X direction.

The dichroic mirror DM2 is, for example, disposed on the +X side of the dichroic mirror DM1 and on the +Y side of the collimator lens CR2 to be tilted at 45°, for example, to the X-axis and the Y-axis to transmit the red light reflected by the dichroic mirror DM1 in the +X direction and reflect the blue light collimated by the collimator lens CR2 in the +X direction. The red light reflected by the dichroic mirror DM1 and the blue light collimated by the collimator lens CR2 are incident on a central area of the dichroic mirror DM2.

The dichroic mirror DM3 is, for example, disposed on the +X side of the dichroic mirror DM2 and on the +Y side of the collimator lens CR3 to be tilted at 45°, for example, to the X-axis and the Y-axis to allow the red light and the blue light transmitted and reflected by the dichroic mirror DM2, respectively, to pass through in the +X direction, and reflects the green light collimated by the collimator lens CR3 in the +X direction. The red light and the blue light transmitted through and reflected by the dichroic mirror DM2, respectively, and the green light collimated by the collimator lens CR3 are incident on a central area of the dichroic mirror DM3.

The three beams of light (i.e., red, blue, and green light) transmitted through or reflected by the dichroic mirror DM3 are synthesized into a single beam. In this case, the color of the synthesized light is determined by the proportions of respective intensities of the beams of light emitted from the three laser diodes LD1 to LD3. Consequently, the light source device 5 emits the synthesized laser light consisting of the three laser beams emitted from the three laser diodes LD1 to LD3 in the +X direction, i.e., toward an optical deflector 100 of the optical deflecting device 1000.

Overall operation of the projector 10 will now be summarized. Image information from a host apparatus, such as a personal computer, for example, is input to the image processing unit 40, subjected to predetermined processing (e.g., distortion correction, image size change, and resolution conversion) performed by the image processing unit 40, and transmitted to the LD control unit 50.

The LD control unit 50 generates a drive signal (i.e., pulse signal) subjected to intensity modulation based on the image information transmitted from the image processing unit 40, and converts the drive signal into drive current. The LD control unit 50 then determines respective light emission times of the laser diodes LD1 to LD3 based on a synchronizing signal transmitted from the optical deflecting device 1000, and supplies the drive current to the laser diodes LD1 to LD3 at the respective light emission times to drive the laser diodes LD1 to LD3. In the above-described intensity modulation, the drive signal may be modulated in pulse width or amplitude.

The optical deflecting device 1000 deflects the synthesized laser light emitted from the light source device 5 toward a scanning surface of a screen S parallel to an XZ plane around two mutually perpendicular axes (i.e., the X-axis and the Z-axis perpendicular thereto in this case), respectively. As a result, the scanning surface is scanned two-dimensionally with the laser light in two mutually perpendicular axial directions (i.e., the Z-axis direction and the X-axis direction in this case), thereby forming a two-dimensional full-color image on the scanning surface. Hereinafter, the X-axis direction and the Z-axis direction are also referred to as the main scanning direction and the sub-scanning direction, respectively. Note that the above-described intensity modulation, which directly modulates the laser diodes LD1 to LD3, may be replaced by external modulation that modulates the laser beams emitted from the laser diodes LD1 to LD3 with an optical modulator.

The optical deflecting device 1000 will now be described in detail. The optical deflecting device 1000 includes, for example, the optical deflector 100, a controller 200, and a memory 300.

Figure 2:
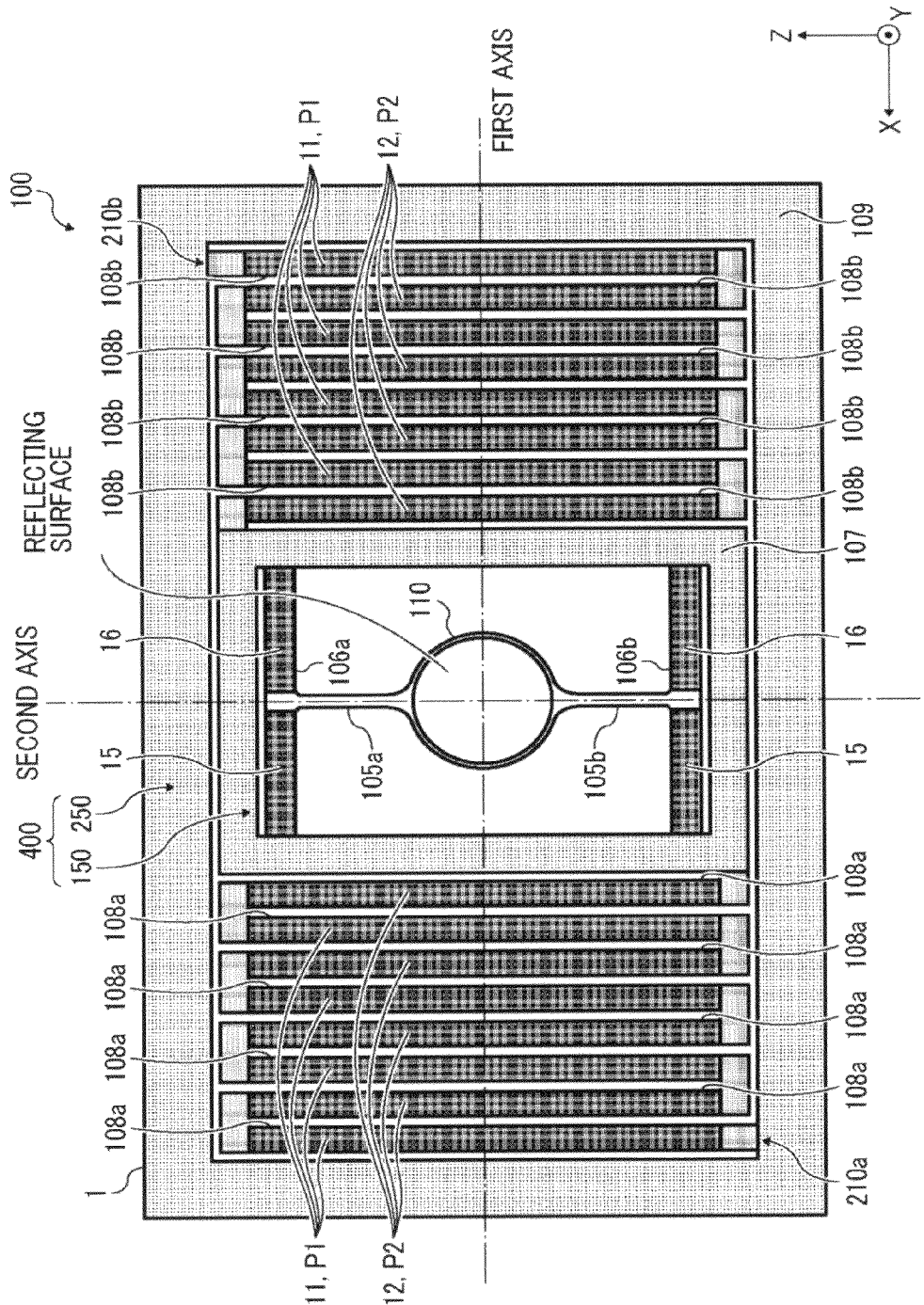
FIG. 2 is a plan view of an optical deflector of the projector in FIG. 1.

As illustrated in FIG. 2, the optical deflector 100 includes a mirror 110, a first drive unit 250, and a second drive unit 150. The mirror 110 has a +Y-side surface serving as a reflecting surface. The first drive unit 250 drives the mirror 110 and the second drive unit 150 around a first axis parallel to the X-axis, for example. The second drive unit 150 drives the mirror 110 around a second axis (e.g., the Z-axis) perpendicular to the X-axis.

Components of the optical deflector 100 are integrally formed by, for example, a micro electro mechanical systems (MEMS) process. Simply stated, the optical deflector 100 is formed by slitting a silicon substrate 1 to form a plurality of movable portions (i.e., elastically deformable portions) and providing piezoelectric members to the movable portions. The reflecting surface of the mirror 110 is formed of, for example, a thin metal film made of aluminum, gold, or silver, for example, and provided on the +Y-side surface of the silicon substrate 1.

The second drive unit 150 includes, for example, two torsion bars 105a and 105b, two beams 106a and 106b, a second rectangular frame 107, and two pairs of second piezoelectric members 15 and 16. The torsion bars 105a and 105b extend in the second axis direction. One end of the torsion bar 105a in the second axis direction and one end of the torsion bar 105b in the second axis direction are respectively connected to the opposed ends of the mirror 110 in the second axis direction. The beams 106a and 106b extend in the first axis direction. An intermediate portion of the beam 106a is connected to the other end of the torsion bar 105a in the second axis direction, and an intermediate portion of the beam 106b is connected to the other end of the torsion bar 105b in the second axis direction. The second rectangular frame 107 has inner edge portions connected to the respective opposed ends of the two beams 106a and 106b in the first axis direction. In one of the two pairs of second piezoelectric members 15 and 16, the second piezoelectric members 15 and 16 are respectively provided to one side portion and the other side portion of the +Y-side surface of the beam 106a across the second axis. In the other pair of second piezoelectric members 15 and 16, the second piezoelectric members 15 and 16 are respectively provided to one side portion and the other side portion of the +Y-side surface of the beam 106b across the second axis.

Herein, the center of the mirror 110 is positioned at the center of the second rectangular frame 107. The two torsion bars 105a and 105b have the same diameter and length. The two beams 106a and 106b each has the shape of a rectangular plate extending in the first axis direction. In each of the two pairs of second piezoelectric members 15 and 16, the second piezoelectric members 15 and 16 have the same shape and size and each has the shape of a rectangular plate extending in the first axis direction.

In the second drive unit 150, if drive voltages are applied in parallel to the two second piezoelectric members 15 respectively provided to the two beams 106a and 106b, the two second piezoelectric members 15 deform, bending the two beams 106a and 106b. Thereby, drive force acts on the mirror 110 around the second axis via the two torsion bars 105a and 105b, swinging the mirror 110 around the second axis. The second drive unit 150 is controlled by the controller 200.

Further, in the second drive unit 150, if drive voltages are applied in parallel to the two second piezoelectric members 16 respectively provided to the two beams 106a and 106b, the two second piezoelectric members 16 deform, bending the two beams 106a and 106b. Thereby, drive force acts on the mirror 110 around the second axis via the two torsion bars 105a and 105b, swinging the mirror 110 around the second axis.

If the controller 200 applies, in parallel (e.g., at the same time), sinusoidal voltages of opposite phases to the two second piezoelectric members 15 and 16 provided to each of the beams 106a and 106b in the second drive unit 150, therefore, the mirror 110 is effectively vibrated around the second axis in the period of the sinusoidal voltages.

Herein, the sinusoidal voltages are set to a frequency of approximately 20 kHz, which corresponds to the resonant frequency of the torsion bars 105a and 105b. With mechanical resonance due to torsion of the torsion bars 105a and 105b, therefore, the mirror 110 is vibrated at approximately 20 kHz. Herein, the maximum swing angle of the mirror 110 from the center of vibration is approximately ±15°.

The first drive unit 250 includes, for example, two meandering portions 210a and 210b, eight first piezoelectric members 11 and 12 (i.e., four first piezoelectric members 11 and four second piezoelectric members 12) provided to each of the meandering portions 210a and 210b, and a first rectangular frame 109.

The meandering portion 210a has one end connected to a −Z-side and +X-side corner of the second rectangular frame 107, and includes a plurality of (e.g., eight) beams 108a continuing in a meandering (i.e., folded) manner. The meandering portion 210b has one end connected to a +Z side and −X side corner of the second rectangular frame 107, and includes a plurality of (e.g., eight) beams 108b continuing in a meandering (i.e., folded) manner. The eight beams 108a of the meandering portion 210a have the eight first piezoelectric members 11 and 12 provided on respective +Y-side surfaces thereof. Similarly, the eight beams 108b of the meandering portion 210b have the eight first piezoelectric members 11 and 12 provided on respective +Y-side surfaces thereof. The first rectangular frame 109 has inner edge portions connected to the other end of the meandering portion 210a and the other end of the meandering portion 210b.

Herein, the center of the mirror 110 is located at the center of the first rectangular frame 109. The eight beams 108a of the meandering portion 210a and the eight beams 108b of the meandering portion 210b have the same shape and size and each has the shape of a rectangular plate extending in the second axis direction. The first piezoelectric members 11 and 12 have the same shape and size and each has the shape of a rectangular plate extending in the second axis direction. The length in the second axis direction (i.e., longitudinal direction) of each of the first piezoelectric members 11 and 12 is somewhat shorter than the length in the second axis direction of each of the beams 108a and 108b provided with the first piezoelectric members 11 and 12.

Among the eight first piezoelectric members 11 and 12 provided in the meandering portion 210a in the first drive unit 250, the four first piezoelectric members 11 are odd-numbered (i.e., first, third, fifth, and seventh) piezoelectric members counted from the +X side. Further, among the eight first piezoelectric members 11 and 12 provided in the meandering portion 210b in the first drive unit 250, the four first piezoelectric members 11 are odd-numbered (i.e., first, third, fifth, and seventh) piezoelectric members counted from the −X side.

In the first drive unit 250, if voltages are applied in parallel to the four odd-numbered first piezoelectric members 11 in each of the meandering portions 210a and 210b, the four first piezoelectric members 11 and the four corresponding beams 108a provided therewith in the meandering portion 210a and the four first piezoelectric members 11 and the four corresponding beams 108b provided therewith in the meandering portion 210b are bent in the same direction around the first axis, thereby swinging the mirror 110 around the first axis.

Among the eight first piezoelectric members 11 and 12 provided in the meandering portion 210a in the first drive unit 250, the four first piezoelectric members 12 are even-numbered (i.e., second, fourth, sixth, and eighth) piezoelectric members counted from the +X side. Further, among the eight first piezoelectric members 11 and 12 provided in the meandering portion 210b in the first drive unit 250, the four first piezoelectric members 12 are even-numbered (i.e., second, fourth, sixth, and eighth) piezoelectric members counted from the −X side.

In the first drive unit 250, if voltages are applied in parallel to the four even-numbered first piezoelectric members 12 in each of the meandering portions 210a and 210b, the four first piezoelectric members 12 and the four corresponding beams 108a provided therewith in the meandering portion 210a and the four first piezoelectric members 12 and the corresponding four beams 108b provided therewith in the meandering portion 210b are bent in the same direction around the first axis, thereby swinging the mirror 110 around the first axis.

Hereinafter, the four odd-numbered first piezoelectric members 11 provided in each of the meandering portions 210a and 210b will collectively be referred to as the piezoelectric member group P1, and the four even-numbered first piezoelectric members 12 provided in each of the meandering portions 210a and 210b will collectively be referred to as the piezoelectric member group P2, for the purpose of clarity.

Figure 3A:
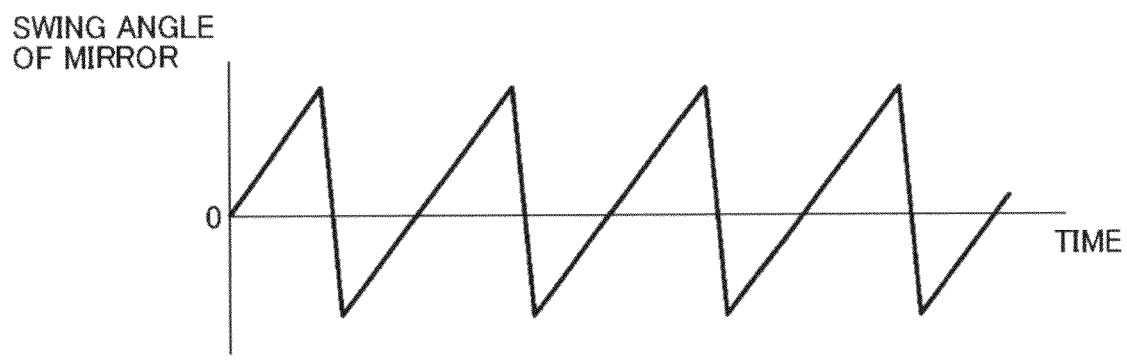
FIG. 3A is a diagram illustrating a change over time of the swing angle of a mirror of the optical deflector in FIG. 2 when the swing speed of the mirror is constant.

In this configuration, if a sawtooth-wave voltage and an inverse sawtooth-wave voltage are applied in parallel (e.g., at the same time) to the two piezoelectric member groups P1 and P2, respectively, in each of the meandering portions 210a and 210b, each adjacent two of the beams 108a and 108b in the meandering portions 210a and 210b are bent in opposite directions around the first axis. With accumulation of respective bend amounts of the beams 108a and 108b, the mirror 110 is vibrated around the first axis effectively (i.e., at a large swing angle with a low voltage) in the period of the sawtooth-wave voltage, as illustrated in FIG. 3A.

Herein, the "sawtooth-wave voltage" refers to a voltage that gradually rises with the lapse of time and sharply falls when having reached a peak, and the "inverse sawtooth-wave voltage" refers to a voltage that sharply rises with the lapse of time and gradually falls when having reached a peak.

The optical deflector 100 thus includes a support unit 400 having a drive mechanism that drives the mirror 110 around the first axis and the second axis, respectively, with the first drive unit 250 and the second drive unit 150. That is, the support unit 400 supports the mirror 110.

Each of the first piezoelectric members 11 and 12 in the first drive unit 250 and the second piezoelectric members 15 and 16 in the second drive unit 150 is made of a piezoelectric material, such as lead zirconate titanate (PZT), for example. When a voltage is applied in the polarization direction, the piezoelectric member is strained (i.e., expands or contracts) in proportion to the potential of the applied voltage, i.e., the piezoelectric member exerts a so-called inverse piezoelectric effect. Further, when pressure is applied, the piezoelectric member generates a voltage in proportion to the pressure, i.e., the piezoelectric member exerts a so-called piezoelectric effect.

The foregoing description has been given of an example in which the piezoelectric members are provided only on one surface (e.g., the +Y-side surface) of the silicon substrate 1. The piezoelectric members, however, may be provided only on the other surface (e.g., the −Y-side surface) of the silicon substrate 1 or on both surfaces (e.g., the +Y-side surface and the −Y-side surface) of the silicon substrate 1 to increase the degree of layout freedom of wiring and the degree of manufacturing freedom of the piezoelectric members. In any case, the piezoelectric members and electrodes are manufactured by a process substantially similar to a semiconductor manufacturing process. Further, it is possible to reduce costs by mass-producing the piezoelectric members.

If light is incident on the mirror 110 vibrating around the second axis, the light reflected by the mirror 110 is deflected and scanned around the second axis. If light is incident on the mirror 110 vibrating around the first axis, the light reflected by the mirror 110 is deflected and scanned around the first axis. To form a high-definition image on the scanning surface and realize in-plane uniformity, therefore, the light incident on the mirror 110 is linearly scanned around the second axis, and a resultant scan line is scanned around the first axis. That is, raster scan is performed.

Specifically, the raster scan is performed by vibrating the mirror 110 at a high frequency with minimum possible energy consumption with the mechanical resonance of the torsion bars 105a and 105b in the second drive unit 150 and non-resonantly vibrating the mirror 110 at a low frequency (e.g., tens of hertz) in the first drive unit 250.

In this case, however, the displacement amounts of the first piezoelectric members 11 and 12 are less than those of the second piezoelectric members 15 and 16. Therefore, the eight first piezoelectric members 11 and 12 respectively provided to the eight beams 108a of the meandering portion 210a and the eight first piezoelectric members 11 and 12 respectively provided to the eight beams 108b of the meandering portion 210b in the first drive unit 250 are operated in parallel as described above, thereby increasing the displacement amounts of the first piezoelectric members 11 and 12.

In the present embodiment, a sawtooth-wave voltage and an inverse sawtooth-wave voltage having the same period are used as the drive voltages applied to the piezoelectric member groups P1 and P2 provided in the meandering portions 210a and 210b.

In this case, it is desirable that the swing speed of the mirror 110 around the first axis, i.e., the change over time of the swing angle (i.e., deflection angle) of the mirror 110, be linear, as illustrated in FIG. 3A. That is, it is desirable that there be no fluctuations in the swing speed of the mirror 110 around the first axis, i.e., that the first drive unit 250 linearly drives the mirror 110 around the first axis.

Figure 3B:
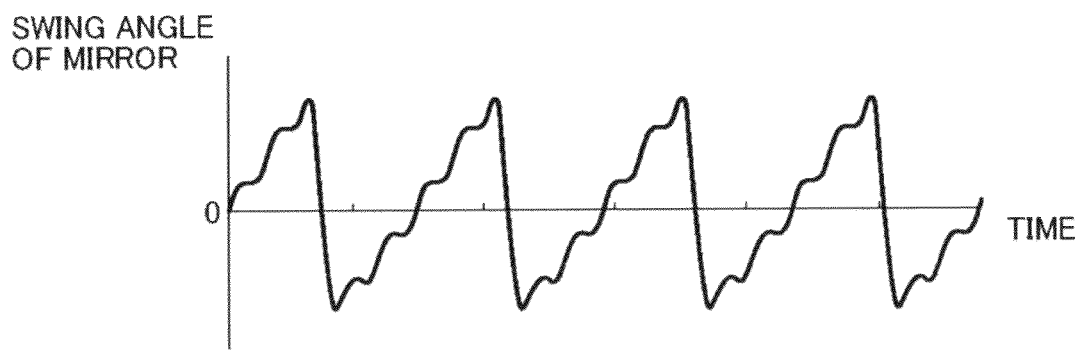
FIG. 3B is a diagram illustrating a change over time of the swing angle of the mirror when the swing speed of the mirror fluctuates.

In the operation of deflecting the mirror 110 around the first axis performed by the first drive unit 250, however, a vibration component of specific mechanical resonance is generated and transmitted to the mirror 110. The specific mechanical resonance is determined by, for example, the weight of a system including the mirror 110 and the second drive unit 150 and the rigidity of the beams 108a and 108b in the meandering portions 210a and 210b. That is, the first drive unit 250 that drives the mirror 110 and the second drive unit 150 around the first axis has the resonant frequency of the specific mechanical resonance. In this case, fluctuations are caused in the change over time of the swing speed of the mirror 110, as illustrated in FIG. 3B. That is, the swing speed of the mirror 110 fluctuates, consequently hindering linear optical scanning and causing uneven luminance and distortion in the image formed on the scanning surface, which result in deterioration of the image quality. Thus, actual driving of the mirror 110 around the first axis performed by the first drive unit 250 is non-linear.

Figure 4:
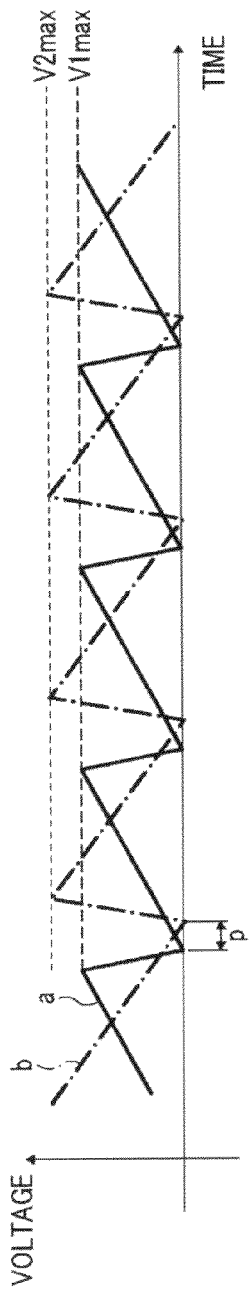
FIG. 4 is a diagram illustrating a first example of waveforms of two drive voltages applied to two adjacent piezoelectric members, respectively.

In the present embodiment, therefore, the sawtooth-wave voltage and the inverse sawtooth-wave voltage having the same period and respectively applied to the two piezoelectric member groups P1 and P2 provided in the meandering portions 210a and 210b are shifted in phase from each other by a phase shift amount p, as illustrated in FIG. 4. Further, in the present embodiment, the sawtooth-wave voltage and the inverse sawtooth-wave voltage applied to the piezoelectric member groups P1 and P2, respectively, have different maximum amplitude values V1max and V2max.

Figure 5:
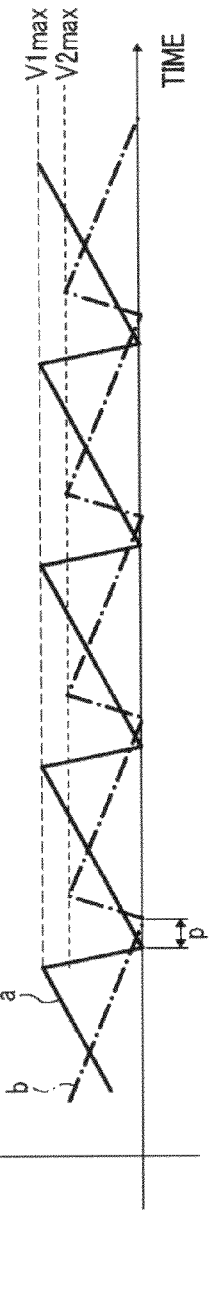
FIG. 5 is a diagram illustrating a second example of waveforms of two drive voltages applied to two adjacent piezoelectric members, respectively.

That is, in the present embodiment, the following two drive voltages having non-similar waveforms are respectively applied to the piezoelectric member groups P1 and P2 in parallel (e.g., at the same time). As illustrated in FIGS. 4 and 5, the two drive voltages are the sawtooth-wave voltage and the inverse sawtooth-wave voltage shifted in phase from each other and having different amplitudes such that the vibration component of the mechanical resonance excited by the deformation of the four first piezoelectric members 11 of the piezoelectric member group P1 in each of the meandering portions 210a and 210b and the vibration component of the mechanical resonance excited by the deformation of the four first piezoelectric members 12 of the piezoelectric member group P2 in each of the meandering portions 210a and 210b cancel each other out. Accordingly, the vibration component of the mechanical resonance in each of the meandering portions 210a and 210b is substantially reduced.

In the optical scanning in the Z-axis direction (i.e., sub-scanning direction) based on the non-linear driving of the mirror 110 around the first axis by the first drive unit 250, the respective voltages applied to the two piezoelectric member groups P1 and P2 are thus set to different phases and amplitudes, thereby minimizing the fluctuations in the swing speed of the mirror 110 (i.e., the change over time of the swing angle of the mirror 110). That is, the linearity of the swing speed of the mirror 110 around the first axis is improved. Accordingly, the uneven luminance and distortion in the sub-scanning direction occurring in the image are minimized, and a high-quality image is formed on the scanning surface.

Further, if a manufacturing error or displacement of a piezoelectric member occurs in the manufacturing process of the optical deflector 100, it is possible to compensate for the manufacturing error or displacement by differentiating (i.e., adjusting) the respective maximum voltages applied to the two piezoelectric member groups P1 and P2. Accordingly, the uniformity of scanning in the sub-scanning direction and the manufacturing yield of the optical deflectors 100 are improved.

Based on a detection result obtained from a sensor that detects the swing angle (i.e., deflection angle) of the mirror 110, the controller 200 generates a synchronizing signal for synchronizing the swing angle of the mirror 110 and the light emission times of the laser diodes LD1 to LD3, and outputs the synchronizing signal to the LD control unit 50. The controller 200 further controls the first drive unit 250 of the optical deflector 100, as described below.

That is, the controller 200 applies the sawtooth-wave drive voltage having a waveform a to the first piezoelectric members 11 of the piezoelectric member group P1 in each of the meandering portions 210a and 210b, and applies the inverse sawtooth-wave drive voltage having a waveform b to the first piezoelectric members 12 of the piezoelectric member group P2 in each of the meandering portions 210a and 210b, as illustrated in FIGS. 4 and 5. Herein, the waveforms a and b are set to a frequency of approximately 60 Hz. The frequency, however, may be changed by a few hertz depending on the resonant frequency of the mechanical resonance in each of the meandering portions 210a and 210b.

The drive voltage having the waveform a and the drive voltage having the waveform b are thus applied in parallel to the two piezoelectric member groups P1 and P2, respectively, in each of the meandering portions 210a and 210b, thereby bending the eight beams 108a of the meandering portion 210a and the eight beams 108b of the meandering portion 210b and vibrating the mirror 110 around the first axis. The optical scanning is thus performed in the Z-axis direction (i.e., sub-scanning direction) based on the non-linear driving of the mirror 110 around the first axis.

In this process, the waveforms a and b are shifted in phase from each other, as illustrated in FIGS. 4 and 5, and the phase shift amount (i.e., phase difference) p is adjusted to reduce, to a certain extent, unevenness (i.e., variation) of the scanning speed in the sub-scanning direction corresponding to the non-linear driving.

FIG. 4 illustrates an example in which the maximum amplitude value V2max of the waveform b is greater than the maximum amplitude value V1max of the waveform a. FIG. 5 illustrates an example in which the maximum amplitude value V1max of the waveform a is greater than the maximum amplitude value V2max of the waveform b.

Herein, the maximum amplitude values V1max and V2max of the drive voltages applied to the piezoelectric member groups P1 and P2 are adjusted to reduce any unevenness in the scanning speed in the sub-scanning direction still remaining after the above-described adjustment of the phase difference and thereby realize optical scanning with improved linearity.

The adjustment of the phase difference and the maximum values of the drive voltages applied to the piezoelectric member groups P1 and P2 improves the linearity of the change over time of the swing angle (i.e., the swing speed) of the mirror 110 around the first axis, since each adjacent two of the beams 108a and 108b in the meandering portions 210a and 210b illustrated in FIG. 2 are not completely symmetrical across a plane parallel to a YZ plane. That is, each adjacent two of the beams 108a and 108b in the meandering portions 210a and 210b are not actually completely symmetrical, although designed to be symmetrical for safe operation. To address such slight asymmetry between each adjacent two of the beams 108a and 108b, therefore, the two drive voltages applied to the piezoelectric member groups P1 and P2, respectively, are adjusted to minimize the mechanical resonance excited in the first drive unit 250.

Description will now be given of an example of the method of adjusting the drive voltages applied to the piezoelectric member groups P1 and P2 provided in the meandering portions 210a and 210b (i.e., the method of adjusting the optical deflecting device 1000). The adjustment is performed during, for example, the manufacturing, shipping, or maintenance of the projector 10.

Figure 6:
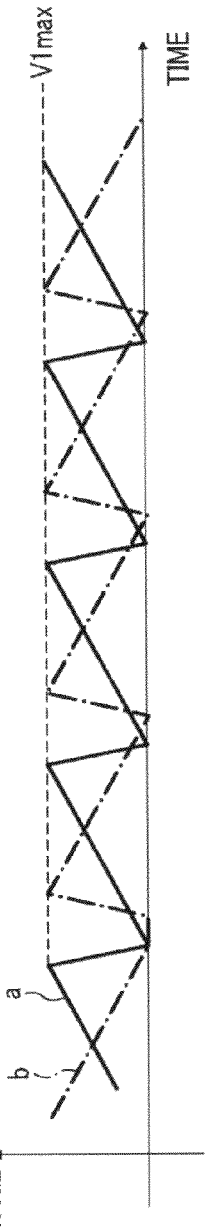
FIG. 6 is a diagram illustrating a method of adjusting an optical deflecting device of the projector in FIG. 1.

A sawtooth-wave voltage and an inverse sawtooth-wave voltage as illustrated in FIG. 6 having the waveforms a and b, respectively, and having the same period, duty ratio, and amplitude (i.e., the maximum amplitude value V1max) are first applied in parallel to the two piezoelectric member groups P1 and P2, respectively, to drive the first drive unit 250 and vibrate the mirror 110 around the first axis. The duty ratio of the sawtooth-wave voltage corresponds to the ratio of the rise time of the voltage to the period of the voltage, and the duty ratio of the inverse sawtooth-wave voltage corresponds to the ratio of the fall time of the voltage to the period of the voltage. Then, laser light is applied to the mirror 110 vibrating around the first axis, and is deflected around the first axis. Herein, the scanning speed in the sub-scanning direction is monitored with, for example, a position sensor diode (PSD) while the waveforms a and b are relatively shifted in phase from each other, to obtain the phase shift amount (i.e., phase difference) p at which the uniformity of the scanning speed (i.e., the swing speed of the mirror 110) is increased.

The obtained phase shift amount p is stored in the memory 300. Herein, the period, maximum amplitude value, and duty ratio of the waveforms a and b are set to values for obtaining a substantially appropriate value of the swing angle of the minor 110 around the first axis.

With the maximum amplitude value of the waveform a fixed to V1max, the maximum amplitude value of the waveform b is then changed and adjusted to V2max to make the scanning speed (i.e., the swing speed of the minor 110) uniform. Then, a maximum voltage ratio (i.e., amplitude ratio) V2max/V1max maximizing the uniformity of the scanning speed is stored in the memory 300 similarly to the phase shift amount p.

When driving the minor 110 to form an image on the scanning surface, the controller 200 reads the phase shift amount p and the maximum voltage ratio V2max/V1max from the memory 300, and applies, in parallel, two drive voltages satisfying the phase shift amount p and the maximum voltage ratio V2max/V1max to the piezoelectric member groups P1 and P2, respectively, in each of the meandering portions 210a and 210b, to thereby drive the minor 110 around the first axis.

Specifically, the memory 300 stores the period and amplitude of the waveform of the voltage applied to one of the two piezoelectric member groups P1 and P2 in each of the meandering portions 210a and 210b, the maximum voltage ratio V2max/V1max, and the phase shift amount p. Based on these parameters, the controller 200 calculates the waveform of the voltage applied to the other one of the two piezoelectric member groups P1 and P2.

In the present example, the maximum amplitude value V2max is adjusted with the maximum amplitude value V1max fixed, and the maximum voltage ratio V2max/V1max obtained thereby is stored in the memory 300. Alternatively, the maximum amplitude value V1max may be adjusted with the maximum amplitude value V2max fixed, and the maximum voltage ratio V2max/V1max obtained thereby may be stored in the memory 300.

Still alternatively, the maximum amplitude values V1max and V2max may both be adjusted, and the respective adjusted values thereof may be stored in and read from the memory 300. In this case, the period and the phase shift amount p of the voltages applied to the two piezoelectric member groups P1 and P2 may also be stored in the memory 300 to allow the controller 200 to calculate the respective waveforms of the voltages applied to the two piezoelectric member groups P1 and P2 based on the period, the phase shift amount p, and the respective adjusted values of the maximum amplitude values V1max and V2max.

Further alternatively, V1max/V2max may be used as the maximum voltage ratio.

As is obvious from the foregoing description, the adjusted waveforms a and b are non-similar waveforms the same in period and duty ratio but different in amplitude, as illustrated in FIGS. 4 and 5.

Figure 7A:
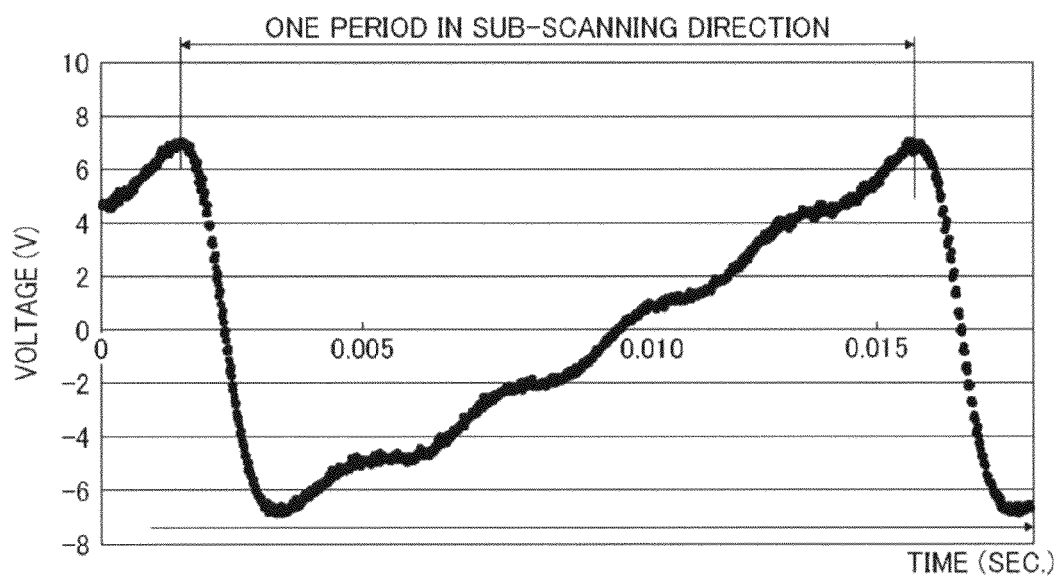
FIG. 7A is a diagram illustrating a waveform of a detection signal from a position sensor diode (PSD) when the swing speed of the mirror fluctuates, and 7B is a diagram illustrating a waveform of a detection signal from the PSD when the swing speed of the mirror does not fluctuate.

FIG. 7A illustrates the waveform of a detection signal output from a PSD when a sawtooth-wave voltage and an inverse sawtooth-wave voltage the same in period, amplitude, and duty ratio and thus having similar waveforms are applied in parallel to the piezoelectric member groups P1 and P2, respectively. It is understood that the scanning speed in the sub-scanning direction (i.e., the swing speed of the mirror 110 around the first axis) is not constant (i.e., uniform) in this case.

Figure 7B:
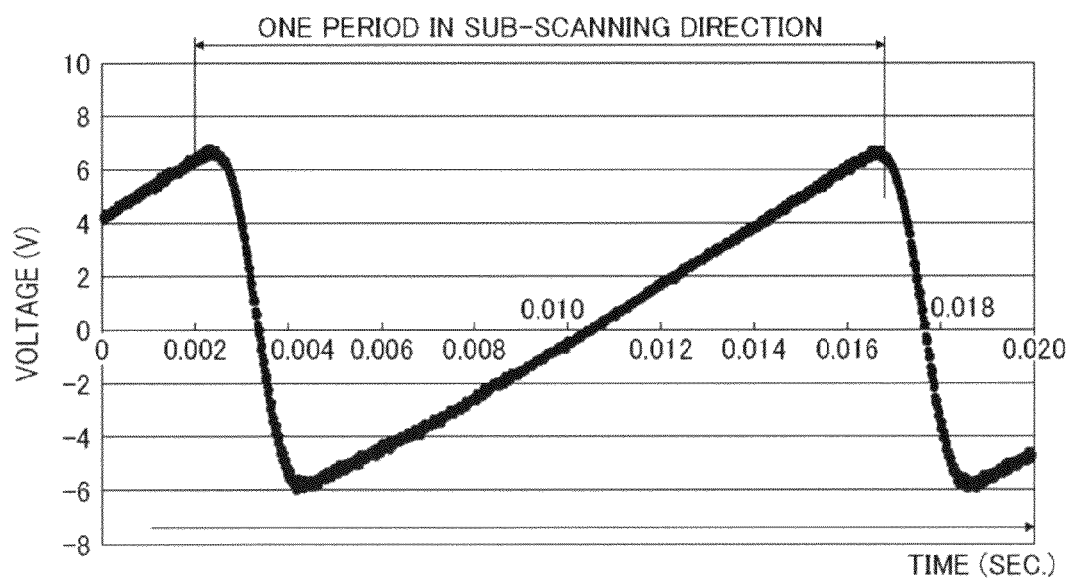

FIG. 7B illustrates the waveform of a detection signal output from the PSD when the drive voltages respectively having the waveforms a and b adjusted as described above are applied to the piezoelectric member groups P1 and P2, respectively. It is understood that the scanning speed in the sub-scanning direction (i.e., the swing speed of the mirror 110 around the first axis) is constant (i.e., uniform) in this case.

The above-described optical deflecting device 1000 according to the present embodiment includes the mirror 110 having a reflecting surface and the support unit 400 supporting the mirror 110 and including the first drive unit 250. The first drive unit 250 includes the meandering portion 210a including the plurality of (e.g., eight) continuously meandering beams 108a, the meandering portion 210b including the plurality of (e.g., eight) continuously meandering beams 108b, the plurality of (e.g., eight) first piezoelectric members 11 and 12 respectively provided to the plurality of beams 108a, and the plurality of (e.g., eight) first piezoelectric members 11 and 12 respectively provided to the plurality of beams 108b, to swing the mirror 110 around the first axis. Further, two drive voltages having non-similar waveforms are respectively applied in parallel (e.g., at the same time) to each two of the first piezoelectric members 11 and 12 respectively provided to adjacent two of the beams 108a and 108b.

In this case, even if the structure of the first drive unit 250 is slightly asymmetrical, the vibration component of the mechanical resonance attributed to the asymmetry is sufficiently minimized. Consequently, even if the structure of the first drive unit 250 is slightly asymmetrical, the optical deflecting device 1000 is capable of minimizing the fluctuations in the swing speed of the mirror 110.

An optical deflector drive device disclosed in JP-2012-198415-A, for example, also includes a mirror having a reflecting surface and a drive unit including a plurality of continuously meandering beams and a plurality of piezoelectric members respectively provided to the plurality of beams to swing the mirror to deflect light incident on the reflecting surface of the mirror.

The optical deflector drive device, however, may fail to minimize the fluctuations in the swing speed of the mirror if the structure of the drive unit is slightly asymmetrical. That is, if two voltage having similar waveforms and opposite phases are respectively applied in parallel to each two of the piezoelectric members respectively provided to adjacent two of the beams in the meandering portions in the optical deflector drive device, and if the structure of the meandering portions is slightly asymmetrical, the vibration component of the mechanical resonance attributed to the asymmetry may not be sufficiently minimized, failing to minimize the fluctuations in the swing speed of the mirror.

In contrast, in the present embodiment, the respective waveforms of the two drive voltages are set to minimize the fluctuations in the swing speed of the mirror 110 around the first axis. Accordingly, the swing angle (i.e., deflection angle) of the mirror 110 changes linearly.

Specifically, the two drive voltages are a sawtooth-wave voltage and an inverse sawtooth-wave voltage having the same period but shifted in phase from each other. Therefore, the vibration component of the mechanical resonance attributed to the slight structural asymmetry of the meandering portions 210a and 210b is minimized to a certain extent, and thus the swing angle of the mirror 110 is changed linearly to a certain extent.

Further, since the two drive voltages have different amplitudes, the vibration component of the mechanical resonance attributed to the slight structural asymmetry of the meandering portions 210a and 210b is sufficiently minimized, and thus the swing angle of the mirror 110 is changed substantially linearly.

The support unit 400 further includes the second drive unit 150 connected to the first drive unit 250 and configured to swing the mirror 110 around the second axis perpendicular to the first axis. With this configuration, it is possible to cause the second drive unit 150 to vibrate the mirror 110 around the second axis and cause the first drive unit 250 to vibrate the mirror 110 around the first axis. It is therefore possible to two-dimensionally scan the scanning surface with light based on the operation of deflecting the mirror 110 performed by the first drive unit 250 and the second drive unit 150. This configuration is smaller in size and lower in cost than, for example, a configuration combining two optical deflectors each having a mirror swingable only around one axis.

Further, the second drive unit 150 includes the two torsion bars 105a and 105b extending in the second axis direction and each having one end connected to the mirror 110, the two beams 106a and 106b connected to the other end of the torsion bar 105a and the other end of the torsion bar 105b, respectively, and the two pairs of second piezoelectric members 15 and 16 respectively provided to the two beams 106a and 106b. With this configuration, it is possible to vibrate the mirror 110 around the second axis at a large swing angle with low power consumption with the resonant frequencies (i.e., mechanical resonance) of the torsion bars 105a and 105b.

Further, the projector 10 includes the light source device 5 that includes the three laser diodes LD1 to LD3 to emit the laser light modulated based on the image information and the optical deflecting device 1000 that deflects the light emitted from the light source device 5 to the scanning surface. With this configuration, it is possible to perform stable scanning of the scanning surface with the light modulated based on the image information, and thus form a high-quality image on the scanning surface. That is, the uniformity of the swing speed of the mirror 110 around the first axis is obtained, making it possible to form a high-quality image with minimized uneven luminance and distortion by using a simple configuration.

According to a two-dimensional scanner drive device disclosed in JP-2011-107505-A, the following method is employed to ensure the uniformity of the scanning speed in raster scan.

That is, in normal two-dimensional scanning with light, harmonics due to non-resonant driving in the sub-scanning direction interfere with the resonant frequency due to the structure in the sub-scanning direction of a scanning drive unit, causing waveform rippling in the sub-scanning direction and thus an uneven scanning speed in the sub-scanning direction. To address this issue, a speed detector is provided to detect the optical scanning speed and generate a speed detection signal, and feedback is returned to the scanning drive unit based on the speed detection signal to reduce the unevenness of the scanning speed in the sub-scanning direction.

This two-dimensional scanner drive device, however, requires an extra sensor mechanism for detecting the optical scanning speed signal, which makes the device complicated in configuration and bulky in size. Further, the two-dimensional scanning involves mixing of signals in the main scanning direction and signals in the sub-scanning direction, increasing a load on a process of preventing such signal mixing. Further, it is difficult to completely prevent such signal mixing. Moreover, optimization of conditions for preventing the signal mixing requires a precise adjustment technique, which increases costs.

Contrastively, the optical deflecting device 1000 according to the present embodiment ensures the uniformity of the scanning speed in the sub-scanning direction in non-resonant driving without an extra sensor mechanism and complicated signal processing, and thus is capable of forming a high-quality image with minimized uneven luminance and distortion. That is, it is possible to realize a uniform scanning speed in the sub-scanning direction at low cost with a simple configuration and control.

Description will now be given of another example of the method of adjusting the drive voltages applied to the piezoelectric member groups P1 and P2 (i.e., the method of adjusting the optical deflecting device 1000). The adjustment is performed during, for example, the manufacturing, shipping, or maintenance of the projector 10.

The sawtooth-wave voltage and the inverse sawtooth-wave voltage illustrated in FIG. 6 having the waveforms a and b, respectively, and having the same period, duty ratio, and maximum amplitude value are first applied in parallel to the two piezoelectric member groups P1 and P2, respectively, to drive the first drive unit 250 and vibrate the mirror 110 around the first axis. Then, laser light is applied to the mirror 110 vibrating around the first axis, and is deflected around the first axis. Herein, the scanning speed in the sub-scanning direction is monitored with, for example, a PSD while the waveforms a and b are relatively shifted in phase from each other, to obtain the phase shift amount (i.e., phase difference) p with which the uniformity of the scanning speed (i.e., the swing speed of the mirror 110) is increased. The phase difference between the two waveforms a and b is thus adjusted.

Then, the obtained phase shift amount p is stored in the memory 300. Herein, the period, maximum amplitude value, and duty ratio of the waveforms a and b are set to values for realizing a substantially appropriate value of the swing angle (i.e., deflection angle) of the mirror 110 around the first axis.

Figure 8A:
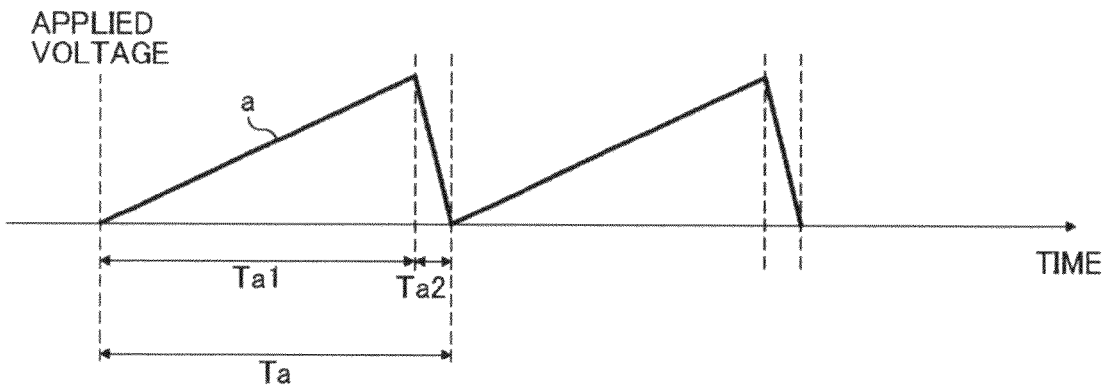
FIG. 8A is a diagram illustrating a waveform of a drive voltage applied to one of two adjacent piezoelectric members in a modified example.
Figure 8B:
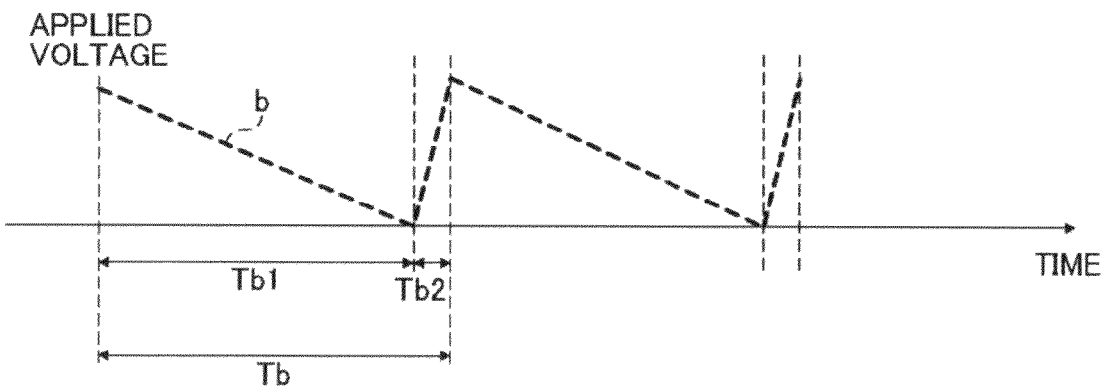
FIG. 8B is a diagram illustrating a waveform of a drive voltage applied to the other one of the two adjacent piezoelectric members in the modified example.

Herein, the waveform a is the sawtooth wave illustrated in FIG. 8A, in which each period is divided into a rise period in which the voltage value gradually rises with the lapse of time for the raster scan and a fall period in which the voltage value sharply falls with the lapse of time. The waveform b is the inverse sawtooth wave illustrated in FIG. 8B, in which each period is divided into a fall period in which the voltage value gradually falls with the lapse of time for the raster scan and a rise period in which the voltage value sharply rises with the lapse of time.

That is, in the waveform a, a time Ta of each period is divided into a time Ta1 of the rise period for the raster scan and a time Ta2 of the fall period for returning to the initial state. In the waveform b, a time Tb of each period is divided into a time Tb1 of the fall period for the raster scan and a time Tb2 of the rise period for returning to the initial state. Herein, the duty ratio of the waveform a, i.e., the ratio of the time Ta1 of the rise period for the raster scan to the time Ta of one period is expressed as symmetry Sa, i.e., Sa=Ta1/Ta. Similarly, the duty ratio of the waveform b, i.e., the ratio of the time Tb1 of the fall period for the raster scan to the time Tb of one period is expressed as symmetry Sb, i.e., Sb=Tb1/Tb.

Although normal driving is performed with the symmetry Sa of the waveform a and the symmetry Sb of the waveform b set to be the same, the symmetry Sa and the symmetry Sb are adjusted to be slightly different from each other in this example. With this adjustment, the unevenness of the scanning speed in the sub-scanning direction still remaining after the above-described adjustment of the phase difference is reduced, realizing optical scanning with improved linearity.

This is because each adjacent two of the beams 108a and 108b in the meandering portions 210a and 210b illustrated in FIG. 2 are not completely symmetrical, i.e., for the same reason as for the uniform scanning speed realized by the foregoing adjustment of the maximum voltage values. To address the slight asymmetry, therefore, the respective voltages applied to the two piezoelectric member groups P1 and P2 provided in each of the meandering portions 210a and 210b are adjusted to minimize the excited mechanical resonance.

The adjustment of the symmetry Sa of the waveform a and the symmetry Sb of the waveform b also compensates for any manufacturing error or displacement of a piezoelectric member occurring in the manufacturing process of the optical deflector 100 and causing slight unevenness of the scanning speed.

Figure 9:
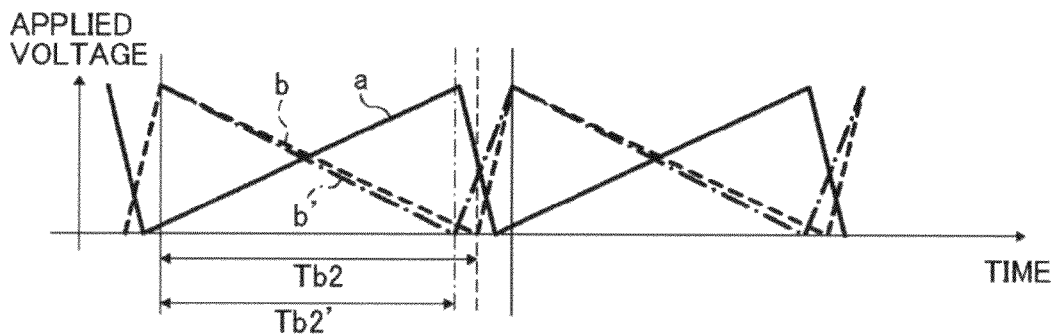
FIG. 9 is a diagram illustrating waveforms of two drive voltages applied to the two adjacent piezoelectric members, respectively, in the modified example.

Specifically, the symmetry Sb of the waveform b of the drive voltage applied to the piezoelectric member group P2 is changed and adjusted with the symmetry Sa of the waveform a of the drive voltage applied to the piezoelectric member group P1 fixed, as illustrated in FIG. 9, such that the scanning speed in the sub-scanning direction (i.e., the swing speed of the mirror 110 around the first axis) becomes uniform. In FIG. 9, b' represents a waveform maximizing the uniformity of the scanning speed, and the symmetry of the waveform b' is expressed as Sb', i.e., Sb'=Tb2'/Tb. Then, a symmetry ratio Sb'/Sa, i.e., the ratio of the symmetry b' to the symmetry Sa is stored in the memory 300 similarly to the phase shift amount p.

When driving the mirror 110 to form an image on the scanning surface, the controller 200 reads the phase shift amount p and the symmetry ratio Sb'/Sa from the memory 300, and applies two drive voltages satisfying the phase shift amount p and the symmetry ratio Sb'/Sa to the piezoelectric member groups P1 and P2, respectively, to drive the mirror 110 around the first axis.

Specifically, the memory 300 stores the period and amplitude of the waveform of the voltage applied to one of the two piezoelectric member groups P1 and P2 in each of the meandering portions 210a and 210b and the symmetry ratio Sb'/Sa and the phase shift amount p of the voltages applied to the two piezoelectric member groups P1 and P2. Based on these parameters, the controller 200 calculates the waveform of the voltage applied to the other one of the two piezoelectric member groups P1 and P2.

In the above-described example, the symmetry Sb is adjusted with the symmetry Sa fixed, and the symmetry ratio Sb'/Sa obtained thereby is stored in the memory 300. Alternatively, the symmetry Sa may be adjusted with the symmetry Sb fixed, and the symmetry ratio Sb'/Sa obtained thereby may be stored in the memory 300. Still alternatively, the symmetry Sa and the symmetry Sb may both be adjusted, and the respective adjusted values thereof may be stored in the memory 300. In this case, the respective periods (i.e., same period) and the phase shift amount p of the voltages applied to the two piezoelectric member groups P1 and P2 may also be stored in the memory 300 to allow the controller 200 to calculate the respective waveforms of the voltages applied to the two piezoelectric member groups P1 and P2 based on the periods, the phase shift amount p, and the respective adjusted values of the symmetry Sa and the symmetry Sb.

Further alternatively, the symmetry ratio Sb'/Sa may be replaced by a symmetry ratio Sa/Sb'.

In the above-described embodiment, the projector 10 forms a color image by causing the optical deflecting device 1000 to deflect the light synthesized from the three laser beams emitted from the three laser diodes LD1 to LD3 corresponding to the three primary colors red (R), green (G), and blue (B) and thereby two-dimensionally scan the scanning surface. The projector 10, however, is not limited to this configuration. For example, the projector 10 may form a monochromatic image by causing the optical deflecting device 1000 to deflect a single laser beam emitted from a single laser diode and thereby two-dimensionally scan the scanning surface.

Figure 10:
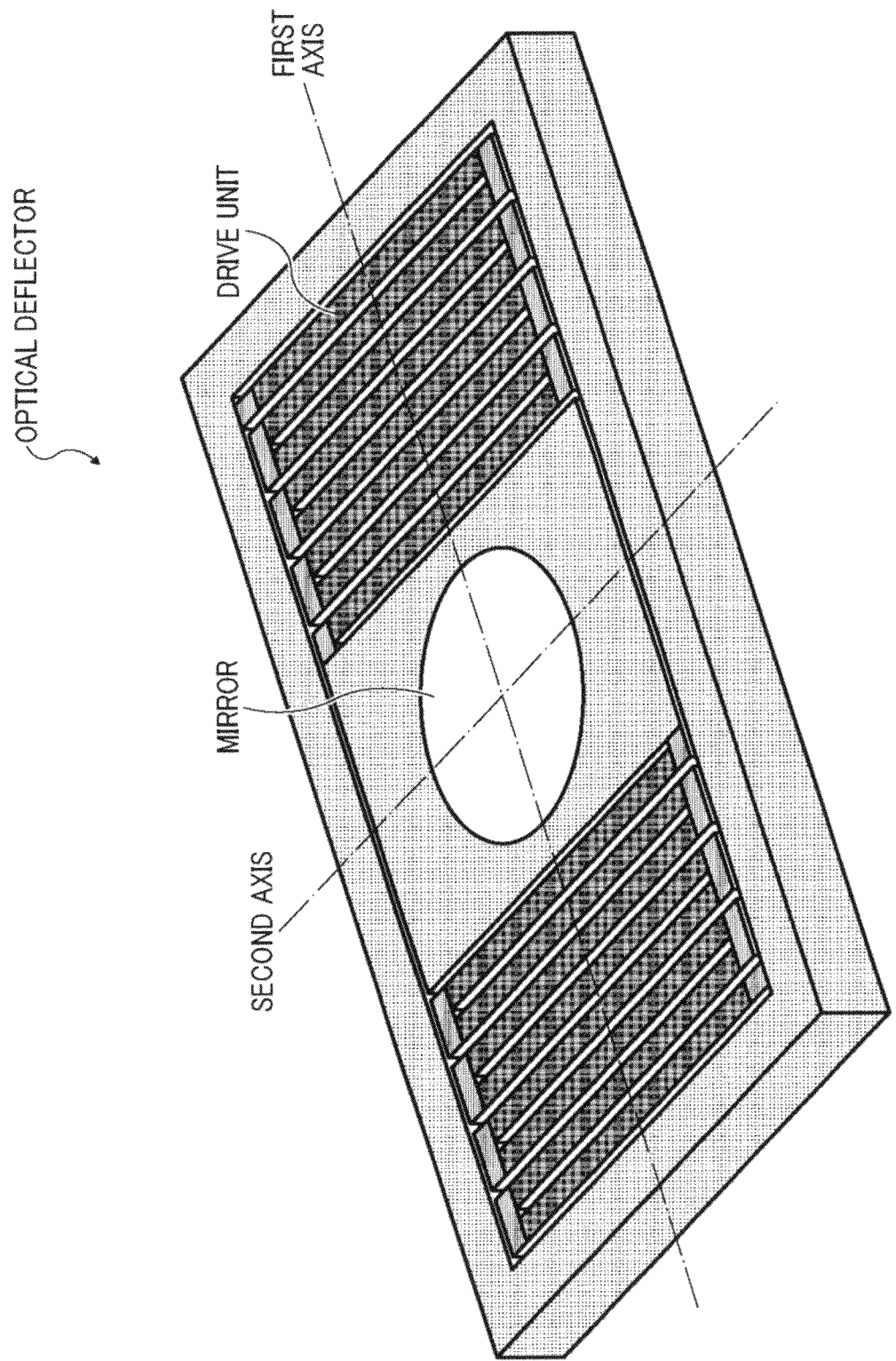
FIG. 10 is a diagram illustrating another example of the optical deflector.

Further, the support unit 400 having the drive mechanism including the first drive unit 250 and the second drive unit 150 is not limited to the configuration in the above-described embodiment, and may be modified as appropriate. For example, in the above-described embodiment, the drive mechanism drives the mirror 110 around the two mutually perpendicular axes (i.e., the first and second axes) respectively, but may drive the mirror 110 only around one axis. Specifically, this disclosure is also applicable to an optical deflector for one-dimensional optical scanning based on non-resonant driving, such as the optical deflector illustrated in FIG. 10. The drive unit in FIG. 10 is similar in configuration to the first drive unit 250. In FIG. 10, the mirror is swingable around the first axis but not around the second axis. In this case, two such optical deflectors may be combined to drive two mirrors around two mutually perpendicular axes respectively. Further, the second drive unit 150 may have a configuration similar to the configuration of the first drive unit 250, and the first drive unit 250 may have a configuration similar to the configuration of the second drive unit 150.

Further, in the above-described embodiment, the projector 10 is employed as an example of an image forming apparatus according to an embodiment of this disclosure. The image forming apparatus, however, is not limited to the projector 10, and may be a printer or a copier, for example. Specifically, for example, the image forming apparatus may form an electrostatic latent image by scanning a surface of a photoconductor drum serving as an image carrier with laser light deflected by the optical deflector for one-dimensional optical scanning illustrated in FIG. 10, develop the electrostatic latent image with toner adhering thereto, and transfer a resultant toner image onto a medium to form an image on the medium.

Further, in the above-described embodiment, the optical deflecting device 1000 is provided in the projector 10 serving as an image forming apparatus. The optical deflecting device 1000, however, is not limited to this configuration, and may be provided in a head-up display 7 illustrated in FIG. 11, for example, which serves as an image forming apparatus. The head-up display 7 is mounted in a vehicle, an aircraft, or a vessel, for example.

Figure 11:
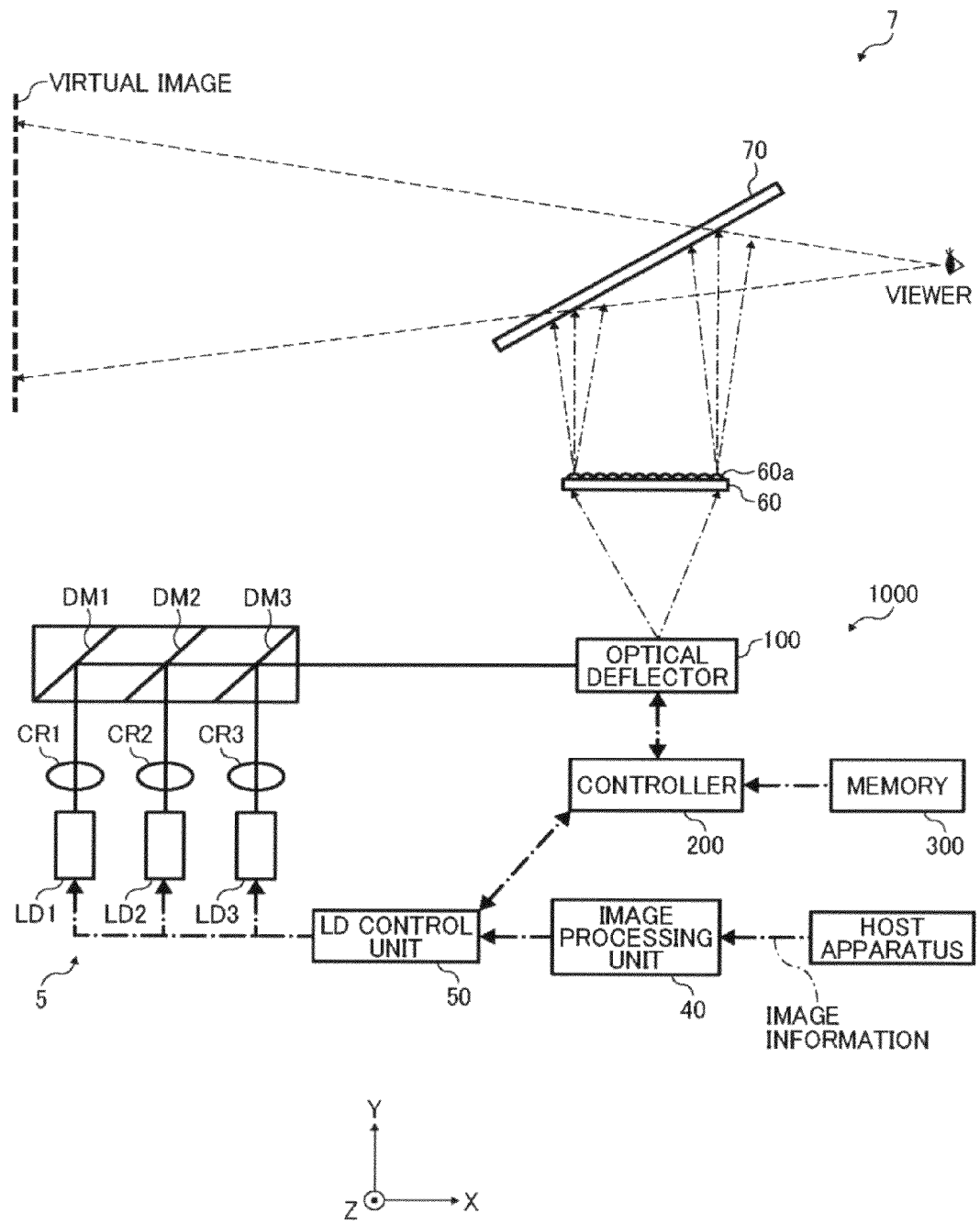
FIG. 11 is a diagram illustrating an example of a head-up display.

Specifically, the head-up display 7 includes a micro lens array 60 and a semitransparent member 70, for example, as illustrated in FIG. 11. The micro lens array 60 includes a plurality of micro lenses 60a arranged two-dimensionally along an XZ plane situated on the optical path of the laser light deflected by the optical deflecting device 1000. The semitransparent member 70, such as a combiner, for example, is disposed on the optical path of the laser light transmitted through the micro lens array 60. In this case, the micro lens array 60 is subjected to two-dimensional scanning with the laser light in accordance with the operation of deflecting the laser light around the first and second axes performed by the optical deflecting device 1000, to thereby form an image on the micro lens array 60. Then, image light transmitted through the micro lens array 60 is incident on the semitransparent member 70 to form a magnified virtual image of the image light. That is, a viewer visually recognizes the magnified virtual image of the image light via the semitransparent member 70. In this case, the image light is diffused by the micro lens array 60, and thus a reduction of so-called speckle noise is expected.

The micro lens array 60 may be replaced by another light transmitting member, such as a transparent screen, for example. Further, a mirror, such as a concave mirror or a plane mirror, for example, may be disposed on the optical path between the semitransparent member 70 and a light transmitting member, such as the micro lens array 60 or a transparent screen, for example. Further, the semitransparent member 70 may be replaced by a windowpane of a vehicle, for example.

Further, the optical deflecting device 1000 may be provided in a head-mounted display similar in configuration to the head-up display 7.

The phase difference between the waveforms a and b is set to a value other than zero in the above-described embodiment, but may be set to zero. Further, the waveforms a and b have the same period in the above-described embodiment, but may have different periods.

Further, the waveforms of the drive voltages applied to the piezoelectric members include sinusoidal wave, sawtooth wave, and inverse sawtooth wave in the above-described embodiment, but are not limited thereto. Basically, it is preferable that the drive voltages applied to the piezoelectric members have a periodic waveform. In particular, it is preferable that the respective waveforms of the drive voltages applied to each adjacent two of the first piezoelectric members 11 and 12 be set to minimize the fluctuations in the swing speed of the mirror 110 around the first axis.

The components of the optical deflector 100 in the above-described embodiment are modifiable as appropriate in location, size, shape, number, material, and so forth. For example, in the second drive unit 150, each of the torsion bars 105a and 105b has one end connected to the mirror 110 and the other end connected to the corresponding one of the beams 106a and 106b. Basically, however, it is sufficient if each of the torsion bars 105a and 105b has a portion connected to the mirror 110 and another portion connected to the corresponding one of the beams 106a and 106b.

The configuration of the light source device 5 in the above-described embodiment is also modifiable as appropriate. For example, the light source device 5 includes the three laser diodes LD1 to LD3 corresponding to the three primary colors of light. The light source device 5, however, may include a single laser diode, or may include four or more laser diodes. In this case, the number of collimator lenses and dichroic mirrors may be changed or reduced to zero in accordance with the number of laser diodes.

Further, although laser diodes (i.e., edge emitting lasers) are employed as the light sources in the above-described embodiment, the light sources are not limited thereto. For example, surface emitting lasers or light sources other than lasers may be employed.

Further, although the projector 10 includes the image processing unit 40 in the above-described embodiment, the projector 10 may not necessarily include the image processing unit 40.

According to this disclosure, it is possible to minimize fluctuations in the swing speed of a mirror, even if the structure of a drive unit for driving the mirror is slightly asymmetrical.

The above-described embodiments are illustrative and do not limit this disclosure. Thus, numerous additional modifications and variations are possible in light of the above teachings. For example, elements or features of different illustrative and embodiments herein may be combined with or substituted for each other within the scope of this disclosure and the appended claims. Further, features of components of the embodiments, such as number, position, and shape, are not limited to those of the disclosed embodiments and thus may be set as preferred. Further, the above-described steps are not limited to the order disclosed herein. It is therefore to be understood that, within the scope of the appended claims, the disclosure of this disclosure may be practiced otherwise than as specifically described herein.

What is claimed is:

1. An optical deflecting device comprising:
   a mirror having a reflecting surface; and
   a support unit to support the mirror,
   wherein the support unit includes a first drive unit including a plurality of continuously meandering first beams and a plurality of first piezoelectric members respectively provided to the plurality of first beams to swing the mirror around a first axis to deflect light incident on the reflecting surface of the mirror, and
   wherein two voltages having non-similar waveforms are respectively applied in parallel to each two of the first piezoelectric members respectively provided to adjacent two of the first beams.

2. The optical deflecting device according to claim 1, wherein the respective waveforms of the two voltages are set to suppress fluctuations in a swing speed of the mirror around the first axis.

3. The optical deflecting device according to claim 1, wherein one of the two voltages has a sawtooth waveform, and the other one of the two voltages has an inverse sawtooth waveform having a period equal to a period of the sawtooth waveform and shifted in phase from the sawtooth waveform.

4. The optical deflecting device according to claim 1, wherein the two voltages have different amplitudes.

5. The optical deflecting device according to claim 4, wherein a ratio between the respective amplitudes of the two voltages and the waveform of one of the two voltages are previously stored, and the waveform of the other one of the two voltages is calculated based on the previously stored ratio between the amplitudes of the two voltages and the previously stored waveform of the one of the two voltages.

6. The optical deflecting device according to claim 4, further comprising:
   a memory configured to store the respective amplitudes of the two voltages; and
   a controller configured to calculate the respective waveforms of the two voltages based on the stored amplitudes of the two voltages.

7. The optical deflecting device according to claim 1, wherein the two voltages have different duty ratios.

8. The optical deflecting device according to claim 7, wherein a ratio between the respective duty ratios of the two voltages and the waveform of one of the two voltages are previously stored, and the waveform of the other one of the two voltages is calculated based on the previously stored ratio between the duty ratios of the two voltages and the previously stored waveform of the one of the two voltages.

9. The optical deflecting device according to claim 7, further comprising:
   a memory configured to store the respective duty ratios of the two voltages; and
   a controller configured to calculate the respective waveforms of the two voltages based on the stored duty ratios of the two voltages.

10. The optical deflecting device according to claim 1, wherein the support unit further includes a second drive unit connected to the first drive unit to swing the mirror around a second axis perpendicular to the first axis.

11. The optical deflecting device according to claim 10, wherein the second drive unit includes torsion bars extending in the direction of the second axis and each having a portion connected to the mirror, second beams connected to another portion of each of the torsion bars, and second piezoelectric members provided to the second beams.

12. An apparatus comprising:
    a light source device including a light source to emit light modulated based on image information; and
    the optical deflecting device according to claim 1 to deflect the light emitted from the light source device to a scanning surface to scan the scanning surface with the light and form an image on the scanning surface.

13. The apparatus according to claim 12, wherein the scanning surface is a surface of a member that transmits the light deflected by the optical deflecting device.

14. A vehicle comprising:
    the apparatus according to claim 12.

15. A method of controlling an optical deflecting device including a mirror having a reflecting surface and a support unit to support the mirror, the support unit including a first drive unit including a plurality of continuously meandering first beams and a plurality of first piezoelectric members respectively provided to the plurality of first beams to swing the mirror around a first axis to deflect light incident on the reflecting surface of the mirror, the method comprising applying, in parallel and respectively, two voltages to each two of the first piezoelectric members respectively provided to adjacent two of the first beams.

16. The method of controlling an optical deflecting device according to claim 15, wherein the two voltages being applied have non-similar waveforms.

17. The method of controlling an optical deflecting device according to claim 15, further comprising setting the respective waveforms of the two voltages to suppress fluctuations in a swing speed of the mirror around the first axis.

18. The method of controlling an optical deflecting device according to claim 15, the method further comprising:

adjusting an amplitude or duty ratio of at least one of the two voltages to suppress fluctuations in a swing speed of the mirror around the first axis; and storing one of the adjusted amplitude or duty ratio and a value in a memory based on the adjusted amplitude or duty ratio.

19. The method of controlling an optical deflecting device according to claim 18, further comprising:

adjusting a phase difference between the two voltages to suppress the fluctuations in the swing speed of the mirror around the first axis; and storing the adjusted phase difference in the memory.

* * * * *